Sept. 15, 1970   H. T. TREACE   3,528,720
OPERATING MICROSCOPE ENVELOPE MEANS
Filed Dec. 18, 1968   3 Sheets-Sheet 1
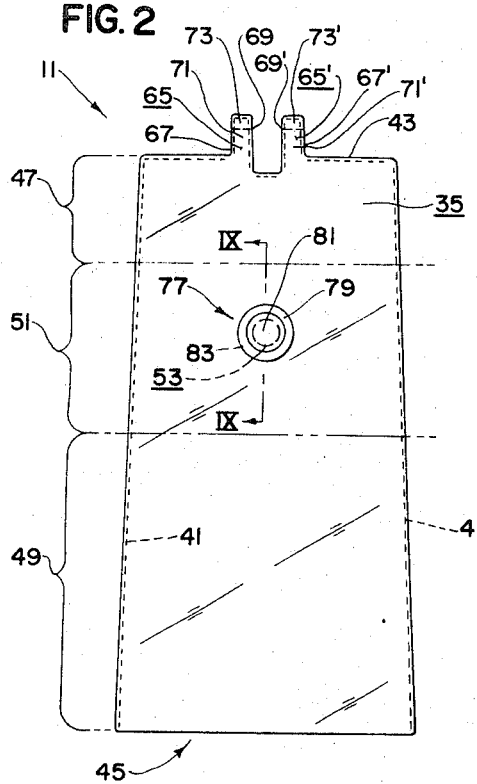
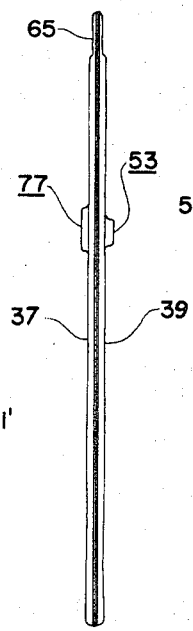
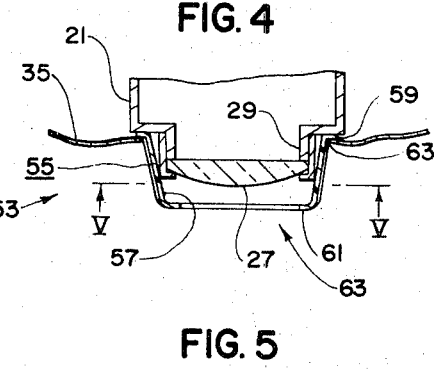
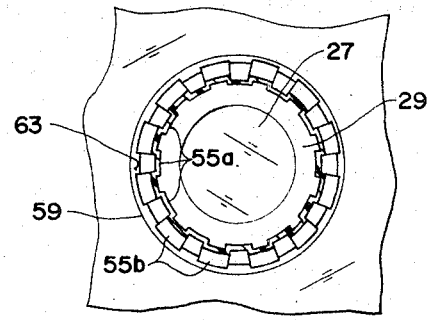
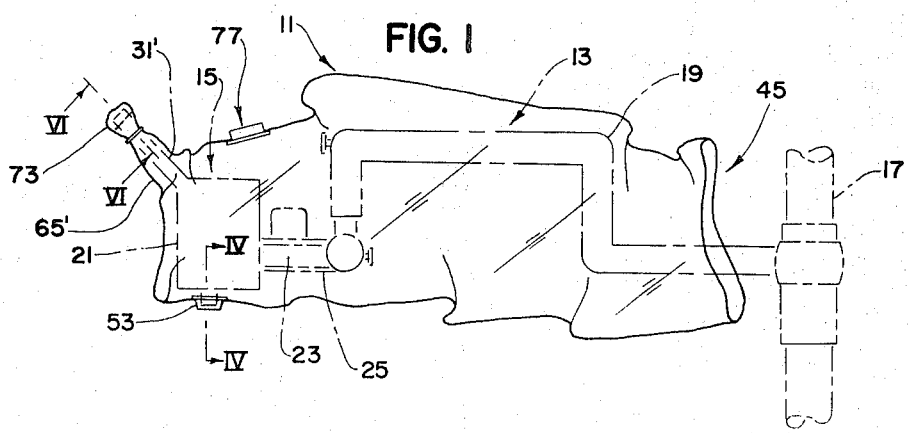
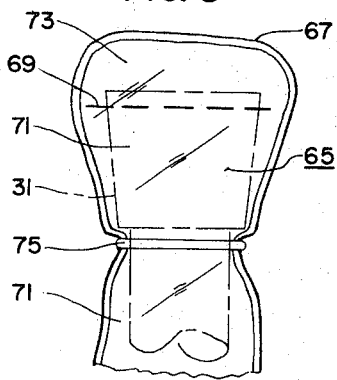
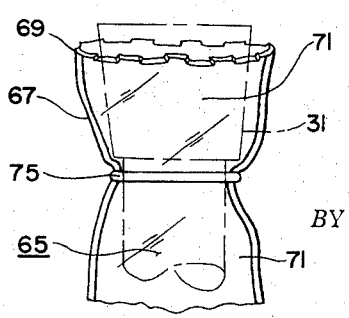
INVENTOR.
HARRY T. TREACE
BY John R. Walker, III
Attorney

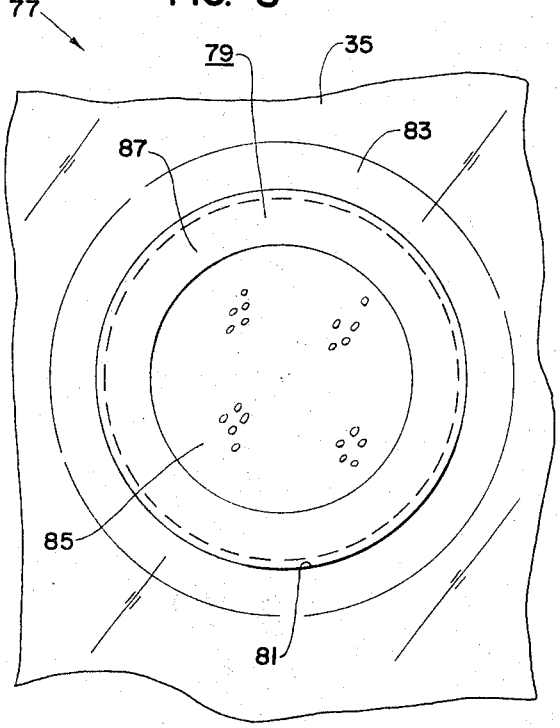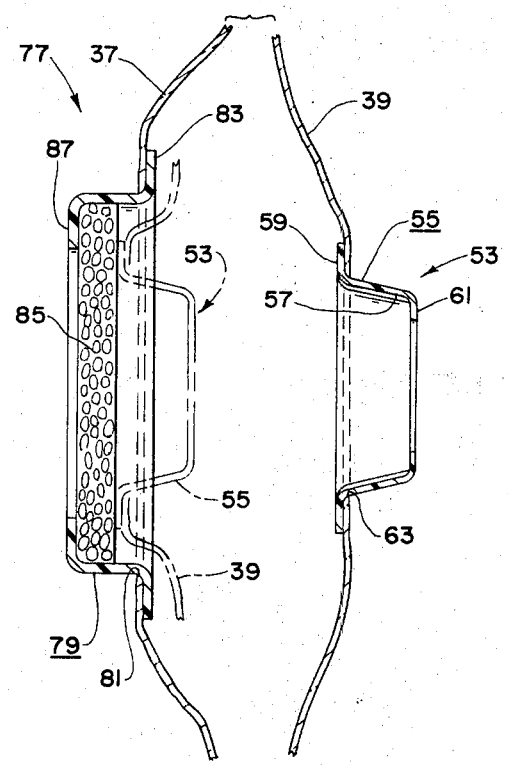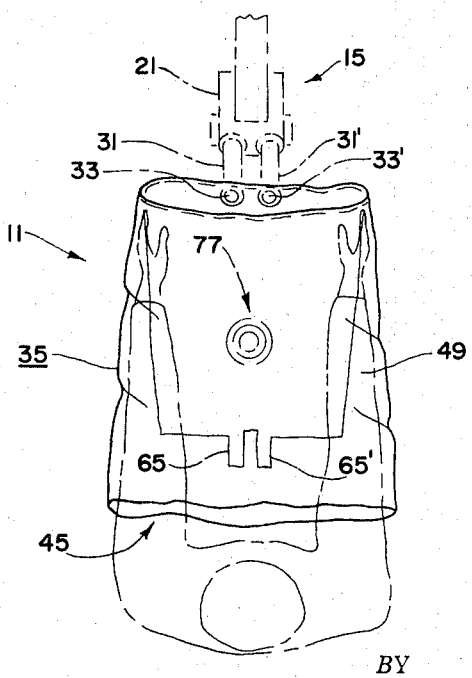

Sept. 15, 1970          H. T. TREACE          3,528,720
OPERATING MICROSCOPE ENVELOPE MEANS
Filed Dec. 18, 1968          3 Sheets-Sheet 3
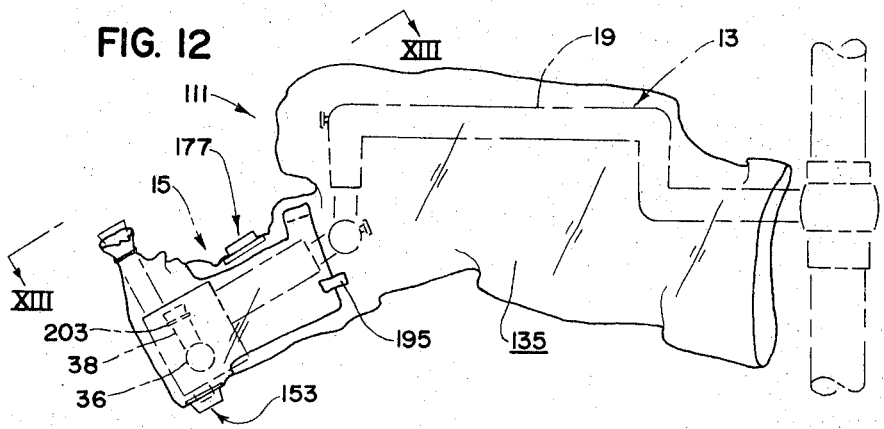
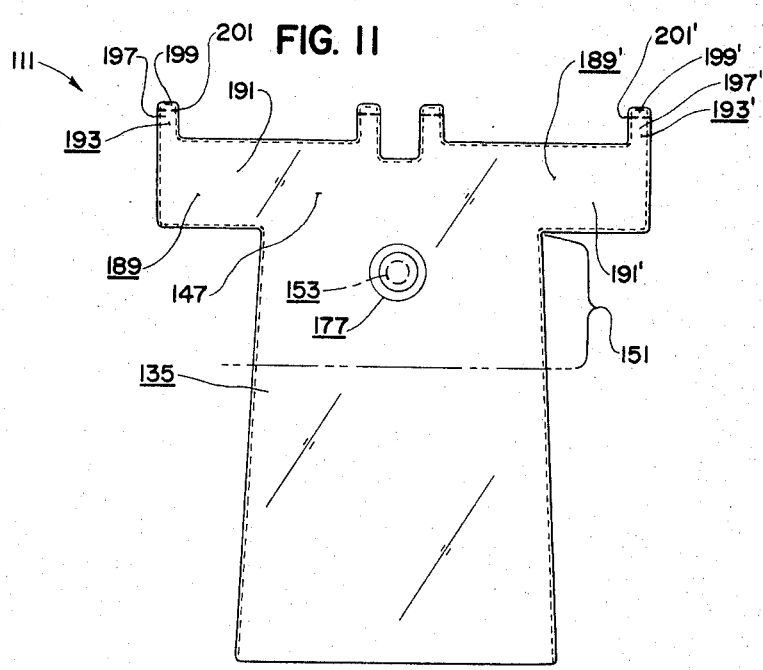
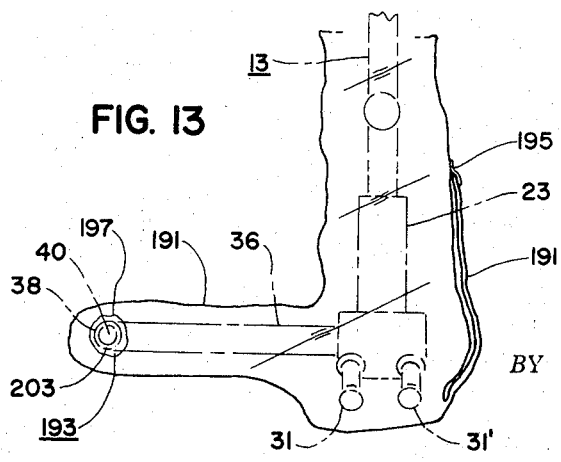
*INVENTOR.*
HARRY T. TREACE
BY John R. Walker III
Attorney

United States Patent Office 3,528,720
Patented Sept. 15, 1970

3,528,720
OPERATING MICROSCOPE ENVELOPE MEANS
Harry T. Treace, Germantown, Tenn., assignor to Richards Manufacturing Company, Inc., Memphis, Tenn., a corporation of Delaware
Filed Dec. 18, 1968, Ser. No. 784,684
Int. Cl. G02b; B65d 85/00
U.S. Cl. 350—61                                    8 Claims

ABSTRACT OF THE DISCLOSURE

A thin clear sheet plastic envelope enclosure adapted to be removably fitted over a cantilever supported operating microscope for maintaining a sterile surgical field. The envelope structure includes circular downwardly flanged ring means adapted to snugly fit concentrically on the objective lens frame of the microscope and includes socklike cover means adapted to fit over the eyepiece projections of the microscope and with each socklike cover means having tear-away scoreline means permitting the upper cap end portions of the socklike cover means to be severed, thereby uncovering the eyepieces for use. A preferred embodiment of the microscope envelope structure includes oppositely projecting sleeve structures adapted to be used for covering one observer arm or both observer arms of a microscope apparatus when such observer arms are used in a surgical operation.

BACKGROUND OF THE INVENTION

Field of the invention

The invention relates generally to instrument covers and particularly relates to a sterile envelope-type cover adapted to cover operating microscope apparatus.

Description of the prior art

The use of the operating microscope in performing certain very delicate operations is becoming increasingly a prevailing practice in surgical technique or procedure. Delicate operations performed on the ear, eye, nose and certain other areas are greatly aided by use of the binocular operating microscope. A problem of particular import in the use of an operating microscope is that problem of properly maintaining the microscope and surgical field in a sterile condition. Since the head or objective lens section of an operating microscope is generally arranged closely above or adjacent the surgical field, it is of prime importance that these microscope parts be maintained lint or dust free and not be contaminated with bacteria. As a surgical procedure is being performed, the microscope head may be repositioned many times and various adjustments may be made during the operation. The surgery room housing the operating microscope generally may not be maintained in a lint free or dustless condition and infrequent use of the operating microscope may cause an unsterile condition of the microscope. Since the microscope may not be sterilized with heat, gas, solutions or the like, cleaning and sterilizing the microscope presents a very substantial problem.

Heretofore, various web or sheet-type wrap-around coverings have been utilized in efforts to obviate the above mentioned problems and to obtain and maintain a sterile surgical field. Various hospitals currently use wrap-around covering devices made of stretchable cotton fabric or stockinette material; the nurses or other hospital personnel fabricate such wrap-around type cover devices from the stockinette material and generally custom fit the stockinette material about the objective section of the microscope. Fabricating such microscope cover means in this fashion is expensive and time-consuming. Certain hospitals may utilize the time of skilled workers such as nurses in fabricating such microscope covers; the use of such skilled personnel in this work may be considered inefficient in certain instances. Of greater importance, however, is the fact that such wrap-around cover devices have not been effective for protecting the microscope or for properly maintaining a sterile surgical field. The prior art wrap-around cover devices do not fully enclose the microscope apparatus and generally enclose only the head or objective section of the microscope. Also, the cotton fabric stockinette material tends to shed lint and collect dust which reduces substantially the effectiveness of a microscope cover formed of such material. Moreover, the thick fabric material presents a problem in properly adjusting the microscope during a surgical procedure; it is somewhat difficult for the operator of the microscope to properly adjust and manipulate the control knobs of the scope which may result in improper scope adjustment or in hampering the surgical procedure. In many operations performed with the aid of a microscope, the surgeon may be working in a limited work space with the objective lens of the microscope positioned closely above the field of surgery. During the operation, the butt end portions of the hand held surgical instruments may engage the objective lens surface and scratch or damage the lens.

Also, with the use of stockinette material or the like, there is danger of contamination to the operating field or surgeon's hands if the material becomes wet from any of many solutions, particularly on the surgeon's hands such as saline solution, blood, or sterile water. This is due to the solution acting as a vehicle for the transfer of bacteria from the unsterile microscope to the surgeon's hands. Many times if the surgeon encounters the above situation, the operation must be stopped to redrape the scope and to reglove the surgeon to insure the sterility of the operating field.

SUMMARY OF THE INVENTION

The microscope envelope means of the present invention is adapted to be fabricated substantially entirely of clear or translucent plastic film material and marketing in a sterile package. The envelope means of the present invention is generally of economical construction and may readily be fitted on or removed from the operating microscope apparatus. The substantially simple design and economical construction of the envelope means and the ready manner in which the envelope means may be fitted on or removed from an operating microscope provides means whereby the envelope may be regularly changed or changed just prior to each operation. After an operation, the enclosing envelope may be left on the operating microscope until the next operation at which time the old envelope may be removed and discarded and a new one installed on the microscope. Such envelope-changing procedure affords dust cover means for the microscope between operations and promotes a sterile surgical field. The thin plastic sheet material of the envelope means is lint and dust free and is sterilized at the time of packaging. The thin transparent plastic sheet material permits ready and accurate manipulation of the adjustment controls of the microscope; the surgeon or operating attendant may quickly and accurately adjust the microscope during a surgical procedure. In addition, the material of the envelope means prevents the undesirable transfer of bacteria by solution as heretofore mentioned. The envelope means is of such form and is packaged in such a manner that it may readily be fitted on a microscope substantially without the user contacting the interior of the envelope, thereby promoting sterile operating conditions.

The envelope structure includes unique socklike eyepiece shielding means which promotes sterile conditions;

the socklike eyepiece shielding portion of the envelope structure is adapted to be fitted over the eyepiece of the microscope and includes frangible scoreline structure permitting the cap portion of the eyepiece shielding to be removed thereby exposing the microscope eyepiece for use. A unique lens guard is afforded by that portion of the envelope means fitted around the objective lens frame of the microscope; a downwardly projecting circumferential flange projects beneath the objective lens affording guard means for preventing the butt end portions of surgical instruments from striking the lens surface and damaging the lens. A preferred embodiment of the envelope means includes sleeve structure adapted to be fitted over observer arms or tubes of the microscope apparatus when such arms or tubes are used in an operation. The envelope means of the invention will accommodate substantially all styles of operating microscopes and all styles or configurations of the cantilever arranged microscope supporting arm structure. The envelope means will accommodate different objective lens sizes, various models or styles of microscopes including straight and inclined eyepieces, horizontal and inclined yokes, or will accommodate substantially any adjustment to the microscope supporting arm structure that may be made in positioning the microscope objective section. The envelope means will accommodate also any of the several types of observer tubes or observer tube mounting structures.

BRIEF DESCRIPTION OF THE DRAWING

FIG. 1 is an environmental showing of one embodiment of the envelope means of the present invention shown fitted over typical operating microscope apparatus (the microscope apparatus being illustrated in broken lines).

FIG. 2 is an upper face showing of the envelope means of FIG. 1, shown removed from the microscope apparatus and in a flattened collapsed disposition.

FIG. 3 is an edge elevational view of the envelope structure taken as from FIG. 2.

FIG. 4 is a vertical plane sectional view of the objective lens ring structure of the envelope means taken as on the line IV—IV of FIG. 1.

FIG. 5 is a horizontal plane upwardly viewed sectional view taken as on the line V—V of FIG. 4.

FIG. 6 illustrates one of the socklike microscope eyepiece cover projections of the envelope means fitted over one of the eyepiece projections of the microscope.

FIG. 7 is a view similar to FIG. 6 but illustrating the socklike eyepiece projection cap portion torn away and revealing the viewing aperture of the microscope eyepiece.

FIG. 8 is a top view of the exhaust port means of the envelope structure.

FIG. 9 is a vertical plane sectional view of the envelope structure in a flattened disposition, taken as on the line IX—IX of FIG. 2.

FIG. 10 is a top view of the envelope structure at one stage of the procedure as it is being telescopically fitted over the microscope apparatus.

FIG. 11 is a second embodiment of the envelope means of the invention and such embodiment having oppositely projecting sleeve means for covering observer tube means of a microscope apparatus.

FIG. 12 is an environmental showing of the envelope means of FIG. 11 fitted over microscope apparatus having one observer arm mounted on the objective section of the microscope head assembly.

FIG. 13 is a view taken as on the line XIII—XIII of FIG. 12.

DESCRIPTION OF THE PREFERRED EMBODIMENTS

The first embodiment of the envelope means of the invention (FIGS. 1–10) is indicated by numeral 11 and will be described in conjunction with typical operating microscope apparatus indicated by numeral 13. The microscope apparatus typically includes a microscope head assembly 15 supported from stationary column structure 17 by an articulated arm assembly 19 (see FIG. 1). The microscope head assembly typically includes an objective section 21 cantilever-supported from the proximal end of articulated arm assembly 19 by support yoke structure 23 lengthwise fitted around typical microscope lamp housing structure 25. Objective section 21 typically includes a downwardly opening objective lens assembly including an objective lens proper 27 and circular lens supporting frame structure 29 (see FIG. 4). Binocular left and right eyepiece projections 31, 31' having respectively viewing apertures 33, 33' project upwardly in typical fashion from microscope objective section 21 (see FIG. 10).

Embodiment 11 of the microscope envelope means includes a tubular or generally sacklike envelope body 35 preferably formed from transparent thin polyethylene plastic sheet material; sacklike body 35 preferably is formed from an upper sheet 37 and a lower sheet 39 of polyethylene sheet material. Left and right arranged lateral seams 41, 41' and forwardly arranged forward seam means 43 sealingly secure together substantially three sides of envelope body 35 leaving a sacklike opening 45. For purposes of clarity in description, envelope body 35 will be considered as being demarcated transversely into front, rear and intermediate body sections 47, 49, 51 respectively (see FIG. 2). When envelope means 11 is fitted telescopically over microscope apparatus 13, the various sections of the envelope body are arranged generally adjacent various parts of the microscope apparatus: When envelope body 11 is fitted on the microscope apparatus, front section 47 generally is arranged around objective section 21 of the microscope; intermediate section 51 of the envelope body is arranged generally around lamp housing and yoke structure 25, 23; and, rear section 49 of the envelope is generally arranged around cantilever-suspended articulated arm assembly 19 of the microscope apparatus.

An objective lens ring 53 is fitted in the underportion of envelope body intermediate section 51 and is adapted to snugly fit around objective lens frame 29 (see FIGS. 1, 4 and 5). Objective lens ring 53 includes an annular body 55 generally frusto-conical in form and having frusto-conical interior surface structure 57 adapted to circumferentially engage microscope objective lens frame 29. Downwardly projecting annular body 55 of objective ring 53 preferably is of thin-wall construction and preferably formed of slightly resilient deformable plastic material. Such construction permits slight deformation of the objective ring annular body 55 for accommodating various sizes of microscope objective lens frames. The upper circumferential portion of objective lens ring 53 preferably is provided with an external circumferential flange 59, and with an inwardly radially projecting flangelike rim portion 61 arranged on the lower circumferential portion of annular body 55. Objective ring structure 53 projects downwardly through a circular aperture 63 in the lower intermediate portion of envelope body 35; external flange portion 59 of objective ring body 55 is sealingly secured by suitable means to the envelope body circumferentially around aperture 63.

The inwardly projecting circumferential rim portion 61 of objective lens ring 53 provides guard means for protecting objective lens 27 from damage by hand held surgical instruments; the downwardly projecting frusto-conical body 55 and rim portion 61 provides fender or guard means for preventing the butt end portions of surgical instruments from damaging the objective lens during an operation. The inturned rim portion 61 also provides safety means for guarding against injury to the hand or palm of the person who applies the envelope structure on the microscope apparatus: In installing the objective lens ring over the objective lens frame of the microscope, a typical procedure is to upwardly press and friction-fit objective lens ring 53 on the microscope lens; rim portion 61 obviates the likelihood of injury to the palm or to the gloved hand of the person who applies the envelope on the microscope.

Annular body 55 of objective ring structure 53 preferably is of crenulated construction and includes alternatingly circumferentially arranged internal and external splinelike portions 55a, 55b (see FIG. 5). Uniformly arranged axially extending internal and external spline portions 55a, 55b permit slight changes in the diameter of the frusto-conical body for accommodating various diameters of objective lens frames. The crenulated construction of frusto-conical body 55 affords a constricting resilient function to the annular body for frictionally securing the objective lens ring to a particular size telescope objective lens.

Envelope body 35 includes left and right eyepiece sock sections 65, 65' formed integrally respectively with upper and lower polyethylene sheet structures 37, 39 and projecting forwardly right angularly from the medial portion of envelope body front section 47. Eyepiece sock sections 65, 65' are formed respectively of confronting generally U-shaped portions of envelopes body 35 and such portions secured respectively by marginal seam means 67, 67' sealingly bonding marginal edge portions respectively of the envelope body material forming eyepiece sock sections 65, 65'. Frangible scoreline structure 69, 69' extending circumferentially transversely around sock sections 65, 65' demarcate respectively the sock sections into sleeve portions 71, 71' and cap portions 73, 73'.

In fitting envelope means 11 on the microscope apparatus, sock sections 65, 65' are first telescopically fitted over eyepiece projections 31, 31'; secondly, rubber band means 75 are then fitted constrictingly around sock sleeve portions 71, 71'; and then, sock cap portions 73, 73' are severed from the respective sleeve portions along frangible scoreline means 69, 69'. Sock cap portions 73, 73' are torn away along scoreline structure 69, 69' from the respective sleeve portions 71, 71' thereby uncovering eyepiece viewing apertures 33, 33' while maintaining a sterile condition for the microscope eyepiece projections (see FIGS. 6 and 7 illustrating the procedure in removing cap portions 73 from sock sleeve portions 71).

Envelope means 11 preferably includes exhaust port means 77 fitted in the upper portion of envelope body intermediate section 51; exhaust port means 77 provides means for exhausting the heated air from the interior of the microscope envelope and such air heated by the objective lens illuminating lamp, not shown, in housing structure 25 (see FIGS. 1, 8 and 9). Exhaust port means 77 includes annular grommet structure 79 sealingly fitted in a circular aperture 81 formed in the upper portion of envelope body intermediate section 51 (see FIGS. 8 and 9). A flange portion 83 sealingly engages circumferential structure adjacent circular aperture 81 and secures grommet structure 79 in envelope body 35. Exhaust port grommet structure 79 preferably is fitted with a disklike mass 85 of open cell foam plastic material arranged fully across the interior opening of the grommet structure; the outer circumferential portion of disk-like mass 85 is preferably adhesively secured to circular flange portion 83 of the grommet structure. The mass 85 of open cell plastic foam material permits a free outward flow of heated air from the interior of the microscope envelope and yet provides baffle or screen means for excluding dust and foreign matter from the interior of the envelope. The disk-like mass 85 of foam material also has been found to be useful for rapidly cleaning the working end portions of hand held surgical instruments; during an operation, the surgeon or attending nurse may quickly wipe a surgical instrument across the upper surface structure of foam plastic disk mass 85 and quickly clean the instrument.

Envelope means 11 preferably is folded in a special way and packaged in a sterile outer covering envelope (not shown). The fold arrangement of envelope means 11 at one stage of packaging the envelope is illustrated in FIG. 10: In packaging the envelope means, front and intermediate sections 47, 51 of envelope body 35 preferably are pulled telescopically into rear section 49. The packaged envelope means is removed from the packaging envelope and unfolded to that stage shown in FIG. 10 and the front and intermediate sections 47, 51 are fitted over microscope head assembly 15; the person fitting the envelope on the microscope thrusts his outstretched arms into rear section 49 of envelope body 35 and between the rear section and combined front and intermediate sections 47, 51 (see FIG. 10). While holding the envelope structure in this manner, the front and intermediate sections 47, 51 are fitted over microscope head assembly 15. Rear section 49 of the envelope means may then be pulled away from the front and intermediate sections and pulled rearwardly over microscope arm assembly 19 (see FIG. 1). After positioning envelope body 35 over the microscope apparatus, objective lens ring 53 is fitted on objective lens frame 29 and left and right eyepiece sock sections 65, 65' are fitted over eyepiece projections 31, 31'. The sterile packaging means for microscope envelope 11; the unique manner of folding the envelope structure; and the unique procedure employed in fitting the envelope on the microscope apparatus is important to the invention and contribute substantially to providing a sterile surgical field.

FIGS. 11-13 illustrate the second embodiment of the invention which is the preferred embodiment. The envelope means 111 of the second embodiment is of substantially the same construction as envelope means 11 but includes left and right observer arm sections 189, 189' projecting oppositely laterally from front section 147 of envelope body 135 (see FIG. 11). In FIGS. 12 and 13 an observer arm 36 is illustrated as being a part of microscope apparatus 13. Observer arm 36 typically includes an eyepiece projection 38 having a typical viewing aperture 40. Although FIGS. 12 and 13 illustrate the microscope apparatus as being fitted with only a left observer arm 36, envelope means 111 will accommondate a microscope apparatus fitted with a left or a right observer arm, or with both left and right observer arms. In fitting envelope means 111 on the telescope apparatus illustrated in FIGS. 12 and 13, left observer arm section 189 of envelope body 135 is arranged over left observer arm structure 36, and right observer arm section 189' of envelope body 135 is folded rearwardly against body intermediate section 151 and taped to the intermediate section as by means of a tape strip 195 (see FIGS. 12 and 13). Left and right observer arm sections 189, 189' include respectively observer arm sleeve portions 191, 191' and observer arm eyepiece sock portions 193, 193'. The construction of each eyepiece sock section 193, 193' of envelope embodiment 111 is substantially the same as the construction of a respective eyepiece sock section 65, 65' of envelope embodiment 11. In like manner, eyepiece sock sections 193, 193' include respectively sock sleeve and sock cap portions 197, 199, 197', 199' and scoreline structure 201, 201'.

The procedure for telescopically fitting a respective observer arm shock section 193, 193' on a respective observer tube eyepiece projection is substantially the same as the procedure for installing a respective eyepiece sock section 65, 65' on a respective one of binocular eyepiece projections 31, 31', and, in like manner, rubber band means is utilized for constrictingly securing the respective sock sleeve portions (197, 197') on the respective observer arm eyepiece projections (38). By way of example, and with reference to FIGS. 12 and 13, observer arm eyepiece sock section 193 of envelope body 135 may be fitted over eyepiece projection 38 of the microscope apparatus in the following manner: Sock sleeve portion 197 of eyepiece sock section 193 is fitted telescopically over eyepiece projection 38; rubber band member 203 is then placed around sock sleeve portion 197; sock cap portion 199 is then severed from sock sleeve portion 197 along scoreline 201 thereby uncovering observer arm viewing aperture 40 (FIGS. 12 and 13 illustrate observer arm eyepiece sock section 193 with sock cap portion 199 severed and removed and with viewing aperture 40 uncovered for use of the observer arm).

Preferably, in fabricating envelope means 11, or envelope means 111, the relative arrangement respectively of the objective lens ring (53 or 153) and the exhaust port means (77 or 177) is like that illustrated in FIG. 9. Preferably, the relative arrangement respectively of the objective lens ring means and the exhaust port means is such that when a respective envelope means (11 or 111) is packaged and arranged in a folded and flattened disposition, the objective lens ring will concentrically nest within the interior of the exhaust port means (see broken line illustration of the objective lens ring in FIG. 9). The nested arrangement of the objective lens ring within the exhaust port means affords compact packaging of the envelope structure and also protects the objective lens ring against damage during shipment.

I claim:

1. Envelope means for enveloping operating microscope apparatus having a microscope head assembly and cantilever arranged arm structure supporting the microscope head assembly, having objective lens structure including a lens frame, left and right eyepiece projections and lamp means for illuminating the objective lens section of the microscope, the enevelope means comprising a substantially long sacklike sterile enevelope body formed of flexible sheet material having an encolsed end and an open end remote from said enclosed end, said body including front, rear and intermediate tubular sections integrally connected together, said rear section defining the open end of said sacklike body, said front section having a forward portion occluding the forward end of said body front section and substantially defining the enclosed end of said body, objective lens ring means fitted in the underportion of said envelope body intermediate section defining aperture structure adapted to snugly fit around the objective lens frame of the microscope, and left and right eyepiece sock sections formed in the forward portion of said envelope body in spaced parallel relationship and communicating with the interior of the enclosed end of said body, the sacklike body of said envelope means being adapted to be slipped over the microscope apparatus with said ring means fitted concentrically on the microscope objective lens and frame and with the left and right sock sections being fitted respectively around the left and right eyepiece projections of the microscope head assembly to protect the operating microscope apparatus and maintain a sterile condition, each sock section of said left and right eyepiece sock sections including a sleeve portion, a cap portion, and frangible juncture means consisting only of portions of said sheet material, detachably securing the cap portion on the sleeve portion, said cap portions respectively of said left and right sock sections being adapted to be detached from the respective sleeve portions at said left and right frangible juncture means for uncovering the viewing apertures of the left and right eyepiece projections.

2. The envelope means as defined in claim 1 which additionally includes rubber band means adapted to encircle each sleeve portion of said left and right eyepiece sock section and constrictingly secure each sock section sleeve portion respectively on said left and right microscope eyepiece projections.

3. The envelope means as defined in claim 2 wherein said frangible juncture means detachably securing the cap and sleeve portions respectively of the left and right eyepiece sock sections together are in the form of scoreline means operative for tear-away detachment respectively of the sock cap portions from the sock sleeve portions.

4. The envelope means as defined in claim 1 wherein said objective lens ring means includes a downwardly projecting circular flange having downwardly converging generally frusto-conical interior surface structure defining the aperture of said ring means and such structure adapted to snugly fit around the objective lens frame of the microscope.

5. The envelope means as defined in claim 4 wherein said downwardly projecting circular flange is of thin-wall form and formed of slightly resilient deformable plastic material, and wherein said ring means additionally includes inwardly radially flanged rim means formed on the lower circular extremity of said downwardly projecting circular flange.

6. The envelope means as defined in claim 1 which additionally includes unsealed and open exhaust port means fitted in the upper portion of said envelope body intermediate section for exhausting air from the interior of said envelope body into the atmosphere.

7. The envelope means as defined in claim 6 wherein said exhaust port means includes grommet means fitted in said upper portion of said envelope body intermediate section defining a substantially large exhaust opening in said body, and includes a mass of open-cell plastic foam material arranged entirely across said exhaust opening.

8. Envelope means for enveloping operating microscope apparatus having a microscope head assembly and cantilever arranged arm structure supporting the microscope head assembly, having objective lens structure including a lens frame, and left and right eyepiece projections, said envelope means comprising a substantially long socklike envelope body means formed of sterilized flexible sheet material having an open end and a closed end for extending over said microscope head assembly and said arm structure to protect same and maintain a sterile condition, objective lens ring means fitted in the underportion of said envelope body defining aperture structure adapted to snugly fit around the objective lens frame of the microscope, and left and right eyepiece sock sections formed in the enclosed end of said body means and of the same sterilized flexible sheet material as said body means, said sock sections being disposed in spaced parallel relationship and extending outwardly from the main portion of said body means with the interior of said socks section communicating with the interior of the main portion of said body means, said sock sections respectively including tubular sleeve portion means for extending over said left and right eyepiece projections to protect same and maintain a sterile condition, and means contacting said sock sections for constrictingly holding said tubular sleeve portion means against said left and right eyepiece projections to protect same and maintain a sterile condition, said sock sections respectively including sock cap portions removably attached to the outer ends of said tubular sleeve attached to the outer ends of said tubular sleeve portion means.

References Cited

UNITED STATES PATENTS

| | | |
|---|---|---|
| 2,071,300 | 2/1937 | Gammeter. |
| 2,431,825 | 12/1947 | Pollock. |
| 3,096,148 | 7/1963 | Walker. |
| 3,382,781 | 5/1968 | Hamilton. |

OTHER REFERENCES

Plastics, "Applications and Processes," February 1964, p. 64.

PAUL R. GILLIAM, Primary Examiner

U.S. Cl. X.R.

206—46; 350—65